Jan. 14, 1969 F. F. LADD, JR., ETAL 3,422,359

DISTRIBUTOR CIRCUIT

Filed Aug. 11, 1965 Sheet 1 of 2

INVENTORS
LYNN W. MARSH, JR.
FREDERICK F. LADD, JR.
BY
Kenway, Jenney & Hildreth
ATTORNEYS INVENTORS
LYNN W. MARSH, JR.
FREDERICK F. LADD, JR.
BY
Kenway, Jenney & Hildreth
ATTORNEYS 3,422,359
DISTRIBUTOR CIRCUIT Frederick F. Ladd, Jr., Newbury, and Lynn W. Marsh, Jr., Marblehead, Mass., assignors, by mesne assignments, to Mohawk Data Sciences Corporation, East Herkimer, N.Y., a corporation of New York Filed Aug. 11, 1965, Ser. No. 478,929
U.S. Cl. 328—62 5 Claims
Int. Cl. H03k 19/34; 19/36

ABSTRACT OF THE DISCLOSURE

Two sets of scan lines are sequentially pulsed by corresponding sets of two-input NOR circuits, each set of which is driven by a common clocking pulse and by outputs from a set of NAND circuits. There is one NAND for each NOR of a set and a corresponding NORs in the two sets are commoned to the same NAND. The NANDs are sequentially enabled by a clock-driven counting circuit which supplies a unique combination of outputs for each NAND.

Our invention relates to electronic distributor circuits, and particularly to a novel distributor circuit for distributing a sequence of signals to a plurality of lines, where each signal must be distributed at least twice in time with each of a pair of clock pulses selected from at least two clock pulse streams which are not in phase.

Data processing systems for computing, sorting, collating, and printing or the like normally require repetitive clocked scanning, as in the scanning of a core plane memory matrix, for example. A typical operation consists in sequentially addressing the storage locations in such a matrix by means of a distributor, conducting a reading operation at each address location, conducting a writing operation subsequent to the reading operation, and then advancing the distributor to the next storage location. The distributor commonly comprises a counter, a group of decoding gates connected to the outputs of the counter, and groups of clocking gates connected to the decoding gates to distribute signals to the successive storage locations in the memory in time with read clock and write clock pulse streams. It is the object of our invention to make it possible to distribute such signals with a minimum of apparatus.

The distributor circuit of our invention is adapted to be used with a system in which means are provided for generating a first clock pulse stream, a second pulse stream out of phase with the first clock pulse stream, and a series of pulses for advancing a distributor to a next address, one for each associated pair of pulses in the first and second clock pulse streams. A system of this general character is used, for example, to scan the core plane memory in a high speed printer to sequentially present character codes stored in the memory to a comparator. Such a system is shown, for example, in U.S. application for Letters Patent Serial No. 393,678, filed September 1, 1964, by David F. Sweeney for Fully Checked Electronic Printing System and assigned to the assignee of our application. In such a system, the first clock stream comprises a series of read sample pulses, the second clock stream comprises a series of write sample pulses produced after an associated read sample pulse, and the distributor is advanced after each write sample pulse. Such a system further comprises a code generator, such as a binary counter or the like, for sequentially producing code sequences identifying the lines to which pulses are to be gated. Decoding gates are conventionally provided for control by the code generator, and include a gate for each code sequence that is to be identified, each gate producing an output signal when and only when an assigned code sequence is supplied to the gates. It is required to gate the output of each decoding gate to at least two different lines at two different times specified by the read and write clock times. Thus, in a conventional core plane memory matrix in which each core is provided with a sense line and an input data line, the core would also be threated with a write sample line and a read sample line, the read and write sample lines being energized sequentially during scanning of the cores for reading or writing purposes. Conventional systems for distributing such pulses to the several addresses of a core plane memory comprise a number of inverters included simply to correct for inversion inherent in the conventional decoding gates. In accordance with our invention, however, advantage is taken of the inversion produced by the decoding gates, and clocking of the gate outputs to a series of lines in time with a series of clock pulses is accomplished directly without the use of extra inverters. Briefly, that is accomplished by using NAND gates as the decoding gates, and consistent NOR gates as the clocking gates. The resulting network is much simpler than conventional networks for the same purpose.

The distributor of our invention will best be understood in the light of the following detailed description, together with the accompanying drawings, of a preferred embodiment thereof.

Figure 1:
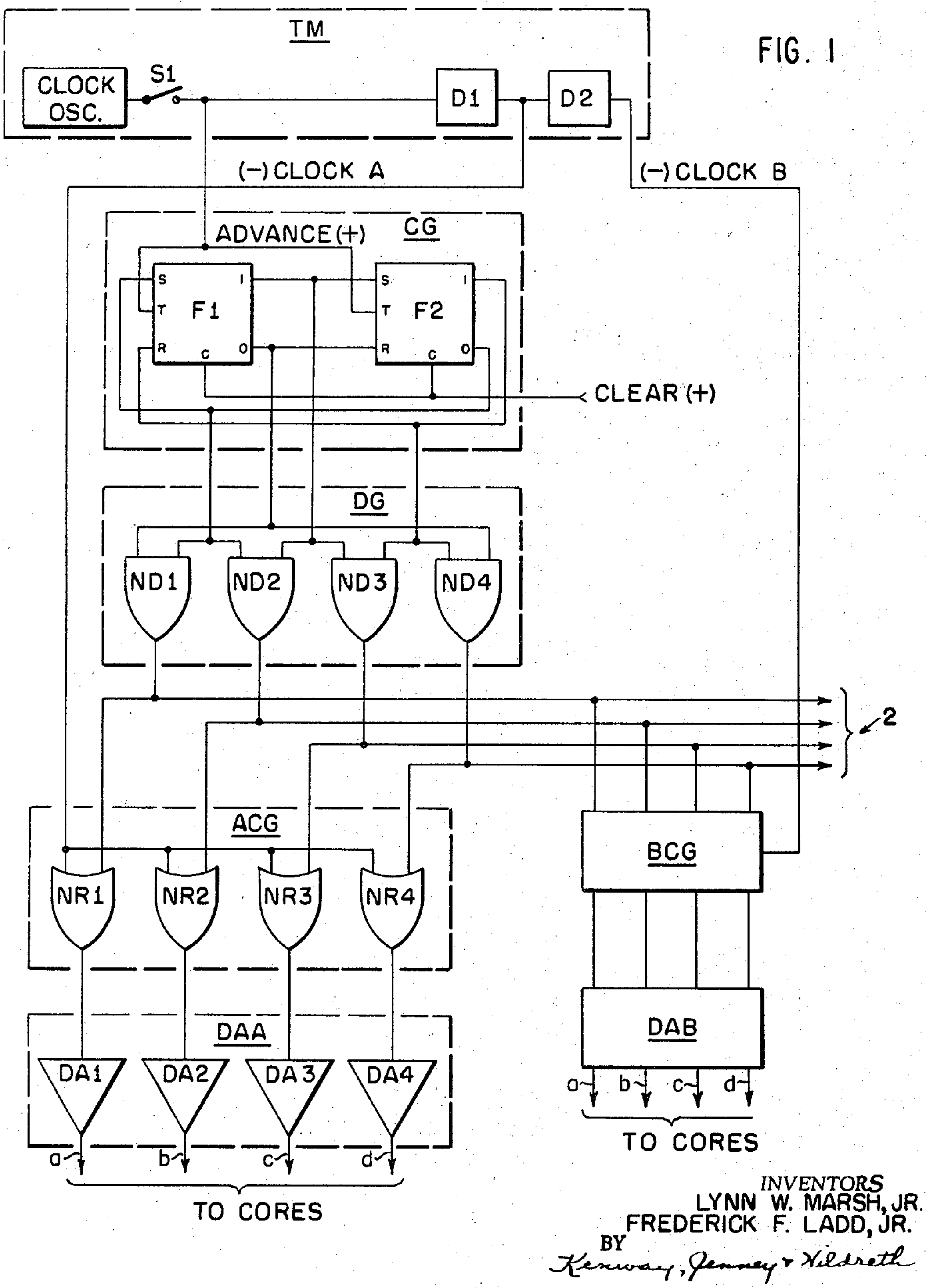
FIG. 1 is a schematic diagram of a distributor circuit in accordance with our invention.
Figure 2:
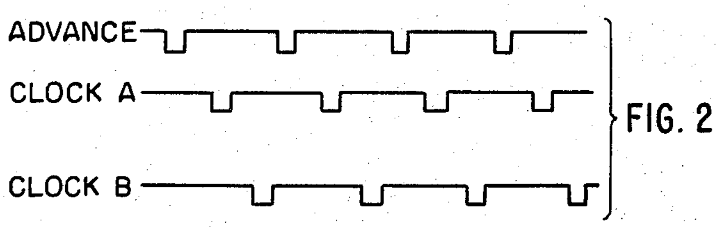
FIG. 2 is a graph illustrating the clock pulses produced in the operation of the apparatus of FIG. 1.

Referring first to FIG. 1, we have shown a distributor circuit in accordance with our invention comprising basically a system timing means TM, a code generator CG, a set of decoding gates DG, a set of clocking gates such as the set ACG and the set BCG for each clock train required in the system, and a set of drive amplifiers, such as the set DAA and the set DAB, for each set of clocking gates. The apparatus of our invention is adapted to any system in which at least two trains of clock pulses which are out of phase are to be used for distribution control, and in which there is a sequence of distributor advance signals provided to control the destinations of the clock pulses. For simplicity, we have shown the apparatus of our invention arranged to be controlled by a relatively simple timing means for producing a train of "Advance" pulses, a delayed train of clock A pulses and a further delayed train of clock B pulses, as shown in FIG. 2. The trailing edge of each Advance pulse is used to trigger the code generator and step it to its next state. For this purpose, as shown in FIG. 1, the timing means TM may comprise a conventional clock oscillator 1, connected through electronic switching means, here shown as a conventional switch S1, to the rest of the system, such that closing the switch S1 will provide the stream of Advanced pulses to the system. These clock pulses are applied to the input terminal of a conventional delay line D1 to produce the train of clock A pulses. The clock A pulses are applied to the input terminal of a second conventional delay line D2, to produce the train of clock B pulses.

The positive-going transition at the trailing edge of each Advance pulse is employed as the distributor advance signal, labelled "ADVANCE (+)" in FIG. 1. This signal is applied to the code generator CG. The code generator CG may be of any conventional construction, but as here shown comprises two conventional flip-flops F1 and F2 interconnected to form a binary counter. These flip-flops may be of any conventional construction, each being provided with a set terminal S, a reset terminal R, a logic 1 output terminal labelled 1, and a logic 0 output terminal labelled 0. The flip-flops are further provided with a trigger input terminal T and preferably with a clear input terminal C. These flip-flops may be of the conventional construction which will assume the set state when a positive level is applied to the input terminal S, and a positive-going transition is applied to the trigger terminal T. They will assume the reset state when a positive level is applied to the input terminal R, and a positive-going transition is applied to the input terminal T. As shown, the 1 output terminal of the flip-flop F1 is connected to the set input terminal S of the flip-flop F2, and the 0 output terminal of the flip-flop F1 is connected to the reset terminal R of the flip-flop F2. The output terminal 1 of the flip-flop F2 is connected to the reset terminal R of the flip-flop F1, and the output terminal 0 of the flip-flop F2 is connected to the input terminal S of the flip-flop F1. The clear terminals C of each flip-flop are connected together, and, as indicated, may be supplied with a pulse labelled "clear (+)" at any time required by a particular system to reset both flip-flops to the reset state. The flip-flops are assumed to be of the type which will produce a positive potential at the output terminal 1 when the flip-flop is in the set state, and a ground potential at that terminal when the flip-flop is in the reset state. Opposite conditions will of course prevail at the 0 output terminal.

With the connections just described, and assuming that both flip-flops are in their reset state, it will be apparent that the S terminal of the flip-flop F1 is at a positive potential because the 0 output terminal of the flip-flop F2 is at a positive potential, and the reset terminal R of the flip-flop F2 is at a positive potential because the 0 terminal of the flip-flop F1 is at a positive potential. Under these conditions, the first positive-going transition applied to the trigger terminals of the flip-flops will cause the flip-flop F1 to assume its set state and the flip-flop F2 to remain in its reset state. The flip-flops will thus be stepped from the binary state 00 to the binary state 01. At the next succeeding positive transition, the flip-flop F1 will remain set and the flip-flop F2 will be set, advancing to the state 11. A subsequent positive-going transition will cause the flip-flop F1 to be reset and the flip-flop F2 to remain set. This corresponds to the binary state 10. Finally, another positive-going transition applied to the flip-flops F1 and F2 will cause the flip-flop F2 to be reset and the flip-flop F1 to remain reset, restoring the apparatus to its initial condition. Thus, the connections shown provide the full complement of binary states, although they do not sequence in the ascending binary fashion.

The output terminals of the code generator CG are connected to a set of decoding gates DG in the manner shown in FIG. 1. The decoding gates comprise four conventional NAND gates ND1, ND2, ND3 and ND4. These gates may be of any conventional construction, but are preferably of the construction shown in FIG. 3 and described below. For present purposes, it should merely be noted that the output terminals of each gate will be at ground potential when and only when both input terminals are at a positive potential, and will be at a positive potential when any input terminal is at ground potential. The gates are shown connected such that the output ground potential will be produced sequentially from left to right in the binary order 00, 01, 11 and 10 of the counter outputs. Thus, the gate ND1 will produce an output ground potential when the 0 output terminals of the flip-flops F1 and F2 are both at a positive potential. The gate ND2 will produce an output ground potential when the flip-flop F1 is set and the flip-flop F2 is reset. The gate ND3 will produce an output ground potential when the flip-flop F1 is set and the flip-flop F2 is set. The gate ND4 will produce an output ground potential when the flip-flop F2 is set and the flip-flop F1 is reset.

The outputs of the gates DG may be distributed to any number of destination lines in accordance with a desired number of out-of-phase clock pulse trains. As here shown, two clock pulse trains A and B have been provided, and the outputs of the gates DG are connected to a first set of clocking gates ACG and a second set of clocking gates BCG. Additional connections for additional clock pulses could be made by connecting additional sets of clocking gates to the same group of leads, as suggested at 2.

Each set of clocking gates such as the set ACG and the set BCG comprises four conventional NOR gates. Thus, the gate set ACG comprises four NOR gates NR1, NR2, NR3 and NR4. These gates are preferably of the type shown in FIG. 4 and described below, but may be of any conventional construction. In the system shown, they must be of the type which produce an output positive potential when and only when all input terminals are at ground potential, and which will produce an output ground potential when any input terminal is at a positive potential.

Each of the gates of the set ACG is provided with two input terminals. One input terminal of each gate is connected to the output terminal of a corresponding decoding gate in the group DG. The other input terminals of all of the gates are connected together and connected to the timing means TM to receive the clock pulses labelled "(−) clock A." Referring briefly to FIG. 2, when the clock A pulses are produced it may be assumed that the lead on which they appear is at ground potential the lower of the two voltage levels depicted.

The clocking gates BCG may be constructed and connected exactly as for the gates ACG, except that these gates receive the clock B pulses.

The output terminals of the gates ACG may be connected to the input terminals of a set of drive amplifier DAA, comprising four conventional amplifiers DA1, DA2, DA3 and DA4. A similar set of drive amplifiers DAB may be provided for the output terminals of the gates BCG. As indicated in FIG. 1, the output leads *a*, *b*, *c*, and *d* of each of the drive amplifiers in the sets DAA and DAB may be threaded through the cores of a core plane memory. For example, in the high speed printer application discussed above, the leads of the set DAA might be connected to the read lines of the core plane memory, and the outputs of the set DAB could be connected to the write lines of corresponding cores.

Figure 3:
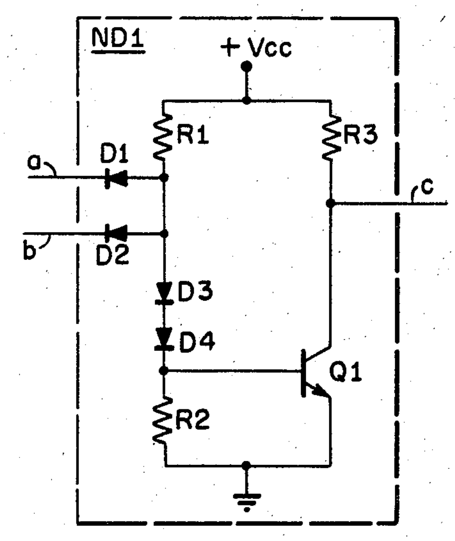
FIG. 3 is a schematic wiring diagram of a suitable NAND gate for use in the system of FIG. 1.

Referring now to FIG. 3, we have shown typical circuits suitable for use as the NAND gates of FIG. 1. The circuit shown is labelled for reference purposes to correspond with the gate ND1 in the decoding gate set DG. Other corresponding gates may be of the same construction.

The typical NAND gate ND1 is here shown as provided with a pair of input terminals *a* and *b* connected through conventional diodes D1 and D2 to a junction point in a potential divider. The potential divider extends from a suitable source of positive voltage +*Vcc* through a resistor R1, a pair of diodes D3 and D4, and a resistor R2 to ground. The junction of the diode D4 and the resistor R2 is connected to the base of a conventional npn transistor Q1. The emitter of the transistor Q1 is grounded, and the collector is returned to the source +*Vcc* through a resistor R3. The components of the circuit ND1 may be discrete components mounted on a printed circuit board as is conventional, or may be made in the conventional manner in the form of integrated circuits.

The output terminal *c* of the NAND gate ND1 is connected to the collector of the transistor Q1. In operation, when ground potential is applied to either or both of the input terminals *a* and *b*, the transistor Q1 will be cut off and the potential at the output terminal *c* will rise positive with respect to ground. When both input terminals *a* and *b* are at a positive potential with respect to ground, the diodes D1 and D2 will be blocked and the potential at the base of the transistor Q1 will be positive, forward-biasing the transistor Q1 to conduct to saturation and reducing the potential of the output terminal *c* essentially to ground potential. While two input terminals *a* and *b* have been shown, it will be apparent that any practical number of additional input terminals could be provided by the use of additional diodes such as D1 and D2 connected at the same point. Thus, extension of the code generator CG to produce a large number of output signals could be taken care of by the use of additional input terminals to the gates such as ND1.

In the NAND circuit ND1, the diodes D3 and D4 serve to decouple the base of the transistor Q1 from the input when the transistor is being turned off. This ensures that the energy gap in the emitter base junction of the transistor Q1 is not exceeded over a reasonably wide range of temperatures and makes it unnecessary to return the resistor R2 to a negative power supply rather than to ground. The diodes D3 and D4 also make the circuit ND1 functional at higher switching speeds. The transistor Q1 is preferably of the silicon type.

Figure 4:
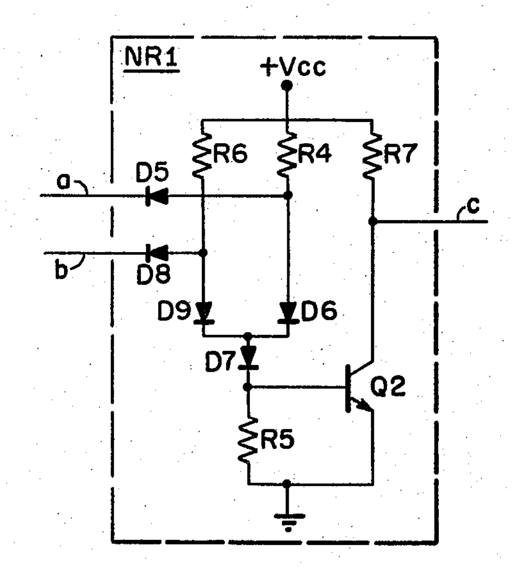
FIG. 4 is a schematic wiring diagram of a suitable NOR gate for use in the system of FIG. 1.

FIG. 4 shows a typical NOR gate NR1. This gate is shown as having two input terminals *a* and *b*, but other input terminals could be provided by an obvious extension of the circuit if desired. Each input terminal such as *a* is connected through a diode such as the diode D5 to a junction in a potential divider path extending from a suitable positive voltage source +V*cc* through a resistor such as R4, a diode D6, a common diode D7, and a common resistor R5, to ground. Thus, the second input terminal *b* is connected through an input diode D8 to a junction point on a potential divider extending from the positive terminal +V*cc* through the resistor R6, the diode D9, the common diode D7 and the common resistor R5 to ground. Other input terminals could be similarly connected.

The junction of the diode D7 and the resistor R5 is connected to the base of a conventional npn transistor Q2, preferably of the silicon type. The emitter of the transistor Q2 is grounded, and the collector is returned to the source +V*cc* through a resistor R7. As in the case of the gate ND1, the components could be either discrete components connected together, or the whole circuit could be made by integrated circuit techniques. It will be apparent to those skilled in the art that complex circuits such as those shown in FIG. 1 could also be made up of integrated circuits if so desired.

The output terminal *c* of the gate NR1 is connected to the collector of the transistor Q2. In operation, if any of the input terminals such as *a* and *b* is positive with respect to ground, the base of the transistor Q2 will be biased forward with respect to the emitter, and the transistor will conduct in saturation bringing the output terminal *c* to ground potential. If all of the input terminals such as *a* and *b* are at ground potential, however, the transistor Q2 will be cut off and its output terminal *c* will go to a potential positive with respect to ground.

The diodes D6, D7 and D9 in the NOR gate NR1 improve the switching speed of the circuit, improve the coupling efficiency, provide limiting when more than one input terminal is made positive, and also serve the logical function of isolating inputs. Specifically, suppose that the input terminal *a* is positive and the input terminal *b* is at ground. The diodes D6 and D7 will conduct in a forward direction, and the base of the transistor Q2 will be biased forward with respect to the emitter. The anodes of the diodes D8 and D9 will be above ground potential only by one diode gap. However, the cathode of the diode D9 will be above ground potential by at least two diode gaps, the base gap of the transistor Q2 and the gap of the diode D7. Accordingly, the diode D9 will be reverse-biased under these conditions and isolate the second input. The provision of these diodes also makes the circuit more stable when the base resistor R5 is returned to ground, rather than to an additional negative supply voltage.

It is believed that the operation of the apparatus just described will be apparent to those skilled in the art from the above description. Briefly, however, the operation is as follows. Assume that the flip-flop F1 in the code generator CG is in its reset state, that the flip-flop F2 is in its set state, and that the switch S1 is closed. The first "Advance (+)" transition will reset the flip-flop F2 and the flip-flop F1 will remain reset. The succeeding clock A pulse will enable the gate NR1 in the gate set ACG. With flip-flops F1 and F2 both reset, the gate ND1 will produce an output ground potential, causing the output terminal of the gate NR1 to assume a positive potential and provide drive current through the amplifier DA1 to the output line *a*. The following clock B pulse will be supplied to the first gate of the set BCG, enabling it to gate the output of the gate ND1 to the first output line *a*. At the next "Advance (+)" transition, the code generator CG will be advanced to count 0–1. At the next succeeding clock A pulse, the events just described will be repeated except that the second gate ND2 in the set DG will enable the second gates such as NR2 in the set ACG to produce output drive current pulses when the corresponding clock pulses arrive. The apparatus will continue to sequence in this manner util the switch S1 is opened.

While we have described our invention with respect to the details of a specific embodiment thereof, many changes and variations will occur to those skilled in the art upon reading our description, and such may obviously be made without departing from the scope of our invention.

Having thus described our invention, what we claim is:

1. A distributor circuit, comprising timing means for repeatedly producing discrete first, second and third timing signals, a cyclic code generator responsive to each first signal for producing on a plurality of output lines a different code sequence in a predetermined chain of code sequences, a plurality of NAND gates each of which is connected to a different combination of said output lines for producing an output logic 0 signal in response to a different one of said code sequences, a first plurality of NOR gates each having first and second input terminals and an output terminal, the first input terminal of each NOR gate being connected to said timing means for receiving each second timing signal and each second input terminal of said NOR gates being connected to the output terminal of a different one of said NAND gates, a second plurality of NOR gates each having first and second input terminals and an output terminal, the first input terminal of each of said second plurality of NOR gates being connected to said timing means to receive each third timing signal, and each second input terminal of said second plurality of NOR gates being connected to the output terminal of a different one of said NAND gates.

2. In combination with a plurality of first terminals, a distributor circuit for sequentially energizing said terminals, said circuit comprising a plurality of NAND gates, one for each terminal and each having at least one input terminal and an output terminal, a plurality of NOR gates, one for each terminal, each having first and second input terminals and each having an output terminal connected to a different one of said first terminals, the first input terminal of each NOR gate being connected to the first input terminals of the other NOR gates, each of the output terminals of said NAND gates being connected to the second input terminal of a different one of said NOR gates, timing means for sequentially enabling each of said NAND gates to produce a logic 0 output signal at its output terminal by applying a logic 1 signal to all of its input terminals, and clocking means synchronized with said timing means for applying a logic 0 pulse to the interconnected input terminals of said NOR gates during each logic 0 signal produced by said NAND gates.

3. In combination with timing means for producing first and second logic 0 clock pulse streams in out-of-phase relation and having the same repetition rate, a first set of terminals and a second set of terminals equal in number to said first set, and distributing means for sequentially energizing said first set in synchronism with said first clock pulses and said second set in synchronism with said second clock pulses, said distributing means comprising a third set of terminals, a code sequence generator responsive to a plurality of sequentially applied signals to apply a plurality of code sequence signals to said third terminals, one code sequence signal for each terminal in said first set, a set of decoding NAND gates, one for each terminal in said first set and each having input terminals connected to a unique combination of said third terminals to produce a logic 0 output signal in response to a different code sequence signal, first and second sets of NOR gates each having first and second input terminals and an output terminal, the output terminal of each NOR gate of said first set being connected to a different one of said first set of terminals, the output terminal of each NOR gate of said second set being connected to a different one of said second set of terminals, the first input terminal of each NOR gate of said second set being connected to said timing means to receive said second clock pulse stream, each second input terminal of the NOR gates of said second set being connected to a different one of said NAND gate output terminals, the first input terminals of the NOR gates of said first set being connected to said timing means to receive said first clock pulse stream, each second input terminal of the NOR gates of said first set being connected to a different one of said NAND gate output terminals, and means for applying a stream of timing signals to said code sequence generator, said timing signals having a repetition rate equal to the repetition rate of said clock pulses.

4. A circuit for selectively supplying decoded output signals responsive to sequentially changing coded input signals comprising, in combination:

a plurality of first circuits, each responsive to an applied plurality of coded input signals for producing an output signal having a first binary value only when each of the applied plurality of signals has a second binary value; and a plurality of second circuits, each responsive to the output signal of a different first circuit and to a common selection signal for producing a decoded output signal of the second binary value only when the output signal from the corresponding first circuit and the selection signal are both of the first binary value.

5. A circuit for selectively supplying decoded output signals responsive to sequentially changing coded input signals comprising in combination:

a selection signal generator for sequentially supplying at least two pluralities of selection signals;

a plurality of first circuits, each responsive to an applied plurality of coded input signals for producing an output signal having a first binary value when each of the applied plurality of signals has a second binary value; and at least two pluralities of second circuits, one second circuit in each plurality responsive to the output signal of a different first circuit and all the second circuits in a plurality responsive to one of the pluralities of selection signals, each second circuit producing a decoded output signal of the second binary value when the output signal from the corresponding first circuit and the selection signal are both of the first binary value.

References Cited

UNITED STATES PATENTS 3,048,716 8/1962 Seley et al. ---------- 307—88.5

ARTHUR GAUSS, *Primary Examiner.*

JOHN ZAZWORSKY, *Assistant Examiner.*

U.S. Cl. X.R.

307—208, 215, 269; 328—63, 93, 103